United States Patent [19]

Ney et al.

[11] Patent Number: 5,058,166
[45] Date of Patent: Oct. 15, 1991

[54] METHOD OF RECOGNIZING COHERENTLY SPOKEN WORDS

[75] Inventors: Hermann Ney; Andreas Noll, both of Hamburg, Fed. Rep. of Germany

[73] Assignee: U.S. Philips Corp., New York, N.Y.

[21] Appl. No.: 523,305

[22] Filed: May 11, 1990

Related U.S. Application Data

[63] Continuation of Ser. No. 175,976, Mar. 31, 1988, abandoned.

[30] Foreign Application Priority Data

Apr. 3, 1987 [DE] Fed. Rep. of Germany ....... 3711342

[51] Int. Cl.⁵ .............................................. G10L 5/04
[52] U.S. Cl. ...................................................... 381/43
[58] Field of Search ............................. 364/513, 513.5; 381/41-43

[56] References Cited

U.S. PATENT DOCUMENTS

| | | | |
|---|---|---|---|
| 4,394,538 | 7/1983 | Warren et al. | 364/513 |
| 4,400,788 | 8/1983 | Myers et al. | 381/43 |
| 4,467,437 | 8/1984 | Tsuruta et al. | 364/513.5 |
| 4,513,436 | 4/1985 | Nose et al. | 381/43 |
| 4,601,054 | 7/1986 | Watari et al. | 381/43 |
| 4,624,008 | 11/1986 | Vensko et al. | 381/43 |
| 4,713,777 | 12/1987 | Klovstad et al. | 381/43 |
| 4,718,094 | 1/1988 | Bahl et al. | 381/43 |

OTHER PUBLICATIONS

Bakis, "Spoken Word Spotting via Centisecond Acoustic States", IBM Technical Disclosure Bulletin, vol. 18, No. 10, Mar. 1976, pp. 3479-3481.
Bourlard et al., "Speaker Dependent Connected Speech Recognition Via Phonemic Markor Models", ICASSP85, Mar. 26-29, 1985, pp. 1213-1216.
Bahl et al., "A Maximum Likelihood Approach to Continuous Speech Recognition", IEEE Trans. on PAMI, vol. PAM-5, No. 2, Mar. 1983, pp. 179-190.
Ney, "The Use of a One-Stage Dynamic Programming Algorithm for Connected Word Recognition", IEEE Trans. on ASSP, vol. ASSP-32, No. 2, Apr. 1984, pp. 263-271.
S. E. Levinson et al., "An Introduction to the Application of the Theory of Probabilistic Functions of a Markov Process to Automatic Speech Recognition", The Bell System Technical Journal, vol. 62, No. 4, Apr. 1983, pp. 1035-1075.

Primary Examiner—Dale M. Shaw
Assistant Examiner—David D. Knepper
Attorney, Agent, or Firm—Jack D. Slobod

[57] ABSTRACT

During the recognition, speech values which are derived from sample values of the speech signals are compared with reference values, the words of a given vocabulary each time being given by a sequence of reference values. The words are then determined from phonemes according to a fixed pronouncing lexicon and the reference values for the phonemes are determined in a learning phase, each phoneme within a word consisting of a number of equal reference values determined in the learning phase. In order to approach transitions between phonemes, each phoneme may also consist of three sections of each time constant reference values. By the given number of reference values per phoneme, the time duration of a phoneme in a given word can be simulated more accurately. Different possibilities are indicated to determine the reference values and the distance value during the recognition.

14 Claims, 1 Drawing Sheet

METHOD OF RECOGNIZING COHERENTLY SPOKEN WORDS

This is a continuation of application Ser. No. 175,976, filed Mar. 31, 1988, now abandoned.

BACKGROUND OF THE INVENTION

1. Field of the Invention

The invention relates to a method of recognizing a speech signal, which is derived from coherently spoken words and which consists of a temporal sequence of speech values, each of which indicates a section of the speech signal, the speech values being successively compared with reference values, of which each time a group of reference values represents a word of a given vocabulary and the reference values are derived from phonemes, while each comparison result is added to a minimum distance sum, which was attained with the preceding speech value for reference values lying in a given neighbourhood increased by a time distortion value depending upon the neighbourhood as a new distance sum.

2. Description of the Prior Art

A method of recognizing coherently spoken words is essentially known from DE-OS 32 15 868. In this case, the individual words are built up of sequences of reference values. It is also known to take phonemes into account, for example from Bell System Technical Journal, Vol. 62, No. 4, April 1983, pp. 1035–1075. A phoneme is then represented in simplified form by a single reference value and in a normally spoken phrase several successive speech values then generally go with such a phoneme reference value because the duration of a section of the speech signals, which is represented by a speech value, is normally shorter than a phoneme. The number of times a speech value corresponds to a phoneme reference value is then not taken into account, however, or rather passes into an increase of the distance sum, as a result of which the real speech signal is not optimally valued.

SUMMARY OF THE INVENTION

The invention has for its object to take into account during the recognition of the phonemes the duration thereof in the naturally spoken speech according to learning speech signals in such a manner that the most probable duration of the phonemes is also optimally valued.

According to the invention, this object is achieved in that each phoneme is formed from a number of reference values at least sectionwise equal to each other, while the number was predetermined with the aid of learning speech values, and in that at reference values within the phoneme the distance sum only of the preceding reference value and only at the last reference value of a phoneme or section also the distance sum of the same reference value with the use of a correspondingly larger time distortion value and only at the first reference value of a phoneme or section within a word the distance sum of each reference value in the preceding phoneme with the use of time distortion values increasing with distance are taken into account.

By means of the method according to the invention, it is achieved that a sequence of speech values suitably going with a phoneme produces only a small distance sum as long as the number of the speech signals optimally corresponding to the phoneme is equal to the number of the reference values in the phoneme. If, however, the spoken phoneme is longer than the reference phoneme, the comparison between speech signals and phoneme quasi remains at the last reference value in the phoneme and then increases the distance sum due to the larger time distortion value then used. If conversely, the spoken phoneme is shorter than the reference phoneme, the comparison with the speech signals jumps from a point within the phoneme to the beginning, i.e. to the first reference value of the next phoneme, a higher time distortion value then also being taken into account. Thus, a difference between a spoken phoneme and a reference phoneme directly passes into the recognition so that words having phonemes, which are equal, but are spoken with different lengths, can be more clearly distinguished from each other. Further, there is started from the fact that a phoneme is at least sectionwise stationary, i.e. is described by a sequence of constant reference values. In fact, with a natural speech signal this does not apply exactly, but a more accurate simulation of the variations of phonemes by continuously varying reference values during the learning phase would be generally so imperfect, also because of a limited number of learning speech values, that the recognition errors are smaller if the phonemes are simulated not quite really by stationary models, but very exactly during the learning phase. For a closer approximation, a phoneme can be formed from, for example, three stationary sections, of which the first and the last section approach the transition to the adjacent phoneme. A simulation of a continuous transition between stationary average sections would also be conceivable.

Frequently, the speech signals are formed in that for each section of the speech signal, for example, the spectral components or the LPC coefficients are formed so that each speech value consists of a number of components. In this case, it is effective that each comparison result is formed from the difference between the component values of speech value and reference value. The differences between the individual component values in fact can be calculated in a technically simple manner. The individual differences between the component values can be further processed in different ways. If each different speech value is considered as a vector of a correspondingly multi-dimensional space, the comparison result can be determined as a euclidic distance in that the comparison result is formed from the sum of the square values of the component differences. A slightly simpler possibility consists in that the comparison result is formed from the sum of the amounts of the component differences. In order to determine the comparison values in a corresponding manner, it is effective that the components of the reference values are produced by formation of the average values of the components of the speech values associated with the respective reference value of learning speech signals. During the formation of the comparison result from the sum of the amounts, it is even more favourable if in a mathematically exact manner the components of the reference values are produced by formation of the median values of the components of the speech values of learning speech signals associated with the respective reference value.

This kind of formation of the comparison results takes into account, in a slightly imperfect manner, the real influence of the difference between speech values and reference values. Another possibility according to a further embodiment of the invention consists in that during a learning phase prototype reference values are selected from the speech signals then produced and for each combination of prototype reference value and phoneme a distance measure is determined, in that during the recognition each speech value is compared with all prototype reference values and each time the prototype reference value having the smallest distance is assigned to the speech value, and in that as a comparison result the distance measure is used for the prototype reference value assigned to the respective reference value and to the phoneme. Thus, each speech value is first returned to the next prototype reference value, the distance from the remaining prototype reference values not being further taken into account thereafter, however. Although this would essentially be possible, it requires an additional amount of labour. The prototype reference values are effectively selected in such a manner that the sum of the distances of all learning speech values from the respective next prototype reference value is a minimum. This means that so-called clusters are formed from the learning speech values, which clusters can be clearly separated from each other, the prototype reference value in each cluster having the smallest distance sum over all distances from the learning speech values within the respective cluster and the cluster being chosen so that the total sum also has a minimum value.

The distance measure for each combination of prototype reference values and phonemes is effectively linked up with the probability with which a prototype reference value within a phoneme occurs. It is efficacious that for determining the distance measure the logarithm of the ratio of the frequency of a prototype reference value in a phoneme to the frequency of all prototype reference values in this phoneme is determined. These frequencies can readily be determined.

Strictly speaking, this step is ideal only with an infinitely large quantity of learning speech values. With a limited quantity of learning speech values or of learning phrases, however, it is possible that individual prototype reference values altogether are of comparatively rare occurrence, but when they occur they characterize a phoneme very accurately. Another prototype reference value which is altogether of very frequent occurrence can have due to its large total frequency in the same phoneme also a comparatively high frequency, but in fact does not characterize this phoneme. In order to overcome this influence, it is effective that for determining the distance measure the probability of connection of prototype reference values and phonemes is approached in that differences of the frequency at which the individual prototype reference values have occurred during the learning phase and at which the different phonemes have occurred are at least reduced by standardization. Due to the standardization of the frequencies, it is achieved that all prototype reference values and all phonemes are taken into account as if their overall frequency over all learning speech values were equal.

Embodiments of the method according to the invention will now be described more fully with reference to the accompanying drawing in which:

DETAILED DESCRIPTION OF THE PREFERRED EMBODIMENTS

During the recognition of a spoken phrase, the speech signal is subdivided into a number of equally long sections, for example having a length of 10 ms, while, for example, for each section the spectral values, the formants or the LPC coefficients are determined. The latter are compared with corresponding reference values, which in a learning phase are produced with the aid of learning speech samples. The recognition then takes place substantially wordwise, each word consisting of a sequence of reference values. In order to determine the sequence of reference values for each word, in the learning phase each word must also be spoken a corresponding number of times.

However, each word also consists of a number of phonemes, the total number of phonemes is limited for all words. In order to shorten the learning phase, it is effective to carry out the learning phase on the basis of phonemes. The words to be recognized are then composed on the basis of a fixed pronouncing lexicon of the phonemes so that in the learning phase not all words, but at least all phonemes must be spoken sufficiently frequently.

Within a phoneme it is assumed that the speech signal is substantially stationary, that is to say that the phoneme consists of a sequence of equal reference values. In order to take phoneme transitions into account, each phoneme may also be composed of three sections, each section normally again being in itself stationary and the intermediate section describing the actual phoneme, while the first and last sections of a phoneme simulate the transition to neighbouring phonemes within the word.

During the recognition of a speech signal, for example according to the aforementioned DE-OS 32 15 868, a time adaptation of the signal to be recognized to the sequences of reference values of the individual words takes place, which is carried out by means of dynamic programming, a sum distance value being determined by the following method.

$$D(i,j) = d(x(i),j) + min\{D(i-1,j') + T(j,j')\} \qquad (1).$$

i means an instant and x(i) means a speech value at a given instant, while j represents a reference value. Consequently, each speech value x(i) is compared with a number of reference values and the difference or the distance $d(x(i),j)$ is determined and is added to the smallest distance sum, which at the preceding speech value at the instant $i-1$ was attained at a reference value $j'$, which lies in a given neighbourhood of the instantaneously considered reference value, a time distortion value $T(j,j')$ moreover being added, which depends upon this neighbourhood, i.e. which is larger as the reference value $j'$ in the sequence of reference values of each time one word is farther remote from the instantaneous reference value $j$. Usually, the diagonal line is then preferred because it corresponds to the most probable form.

Figure 1A:
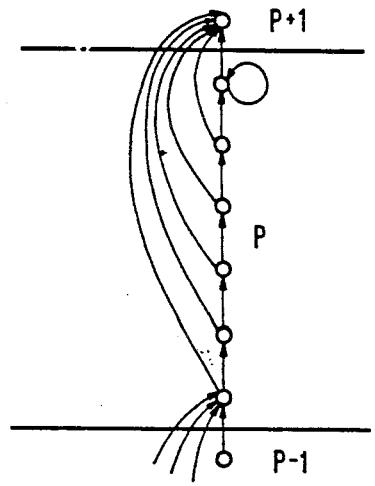
FIG. 1a and 1b show the transitions in accordance with a Markov model and the resulting transitions with successive speech values.

In a phoneme the reference values are now assumed sectionwise to be constant so that it could be obvious to provide this reference value only once. However, in order to correctly simulate the time duration of the phoneme, the reference value within the phoneme is present so often as it corresponds to the actual duration of the phoneme or of the phoneme section. In FIG. 1a is shown a sequence of states corresponding to a Markov model represented by a column of small circles possible transitions between the individual states being indicated by arrows. The states between the two horizontal stripes are to represent a phoneme p or a phoneme section. The first state in the phoneme p is reached by an arbitrary point in the preceding phoneme p−1 indicated by a plurality of arrows. The state succeeding in time lies above it and can be reached by the first state, but it is also possible to pass directly from the first state to the first state of the next phoneme p+1. However, this transition is very improbable. Correspondingly, the transition from the second to the third state is much more probable than the transition from the second state to the first state of the next phoneme, etc. The last state can be traversed several times indicated by a circular arrow, but this is also less probable than the transition into the next phoneme.

Figure 1B:
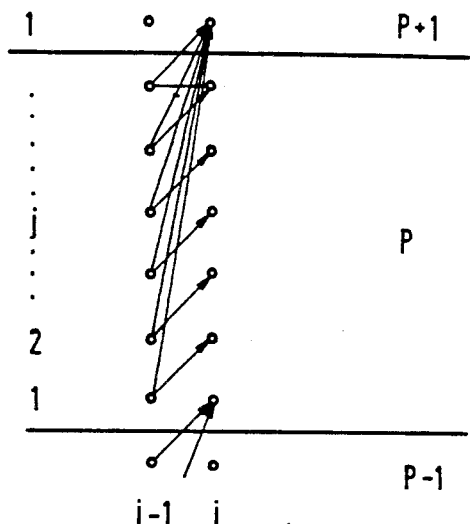

FIG. 1b indicates which sequences in time of the non-linear time adaptation are possible with the dynamic programming. The small circles represent reference values j. The new speech value at the instant i is compared with the reference value j=1 and this local distance is added to the distance sum of such a reference value in the preceding phoneme p−1 that together with the distance-dependent time distortion value a minimum is obtained.

Further, the instantaneous speech value is also compared with the second reference value j=2, but the latter has the same value as the reference value j=1 so that also the same local distance is obtained. However, the latter is added to the distance sum which has been obtained at the preceding instant i−1 at the first reference value j=1. Correspondingly, the local distance is added at the next reference value to the distance sum obtained thus far of the second reference value, etc. Solely at the last reference value, also the distance sum of the same reference value at the instant i−1 is taken into account and this corresponds to the case in which in the spoken speech signal the relevant phoneme is longer than is determined in the learning phase. In this case, again a larger time distortion value is taken into account. Solely the first reference value of the next phoneme p+1 can be reached by any other reference value in the phoneme p each time taking into account corresponding time distortion values, which take into account the transition probabilities in the Markov model.

For the formation of the local distance $d(x(i),j)$ there are different possibilities, which also influence the formation of the reference values.

A simple possibility consists in determining the distance value as euclidic distance in the following manner:

$$d_1(x(i),j) = \sum_k (x_k(i) - r_k(j))^2 \quad (2)$$

$r_k(j)$ then represents the components of the reference value, of which each component k is equal to the average value of the components of the speech values in the learning phase.

Another possibility for the distance value is the absolute amount of distance:

$$d_2(x(i),j) = \sum_k |x_k(i) - r_k(j)| \quad (3)$$

The individual components $r_k(j)$ of a reference value are chosen here to be equal to the median of the components of the associated speech values in the learning phase. On approximation, however, also in this case the average value can be used because this substantially does not influence the recognition.

These distance values must be calculated for each new speech value x(i) for all reference values or in the case of limited search for all the active reference values, which requires a considerable amount of time. A further possibility to determine the local distance value is given in the following manner:

$$d_3(x(i),j) = -\log (p(1/j)) \quad (4).$$

In this case, 1 indicates a vector $Z_1$ from a finite quantity of prototype reference values $Z_1, Z_2 \ldots Z_n$, which has the smallest distance from the speech value x(i). This distance can be determined in the same manner as with the aforementioned possibilities.

The local distance is then consequently the negative logarithm of the conditional probability that the prototype reference value $Z_1$, which is closest to the instantaneous speech value x(i), has occurred in the phoneme j or the phoneme section during the learning phase. A phoneme then does not directly correspond to a single prototype reference value, whose number is otherwise chosen to be larger than the number of phonemes, for example by the factor 3 larger.

The prototype reference values are determined during the learning phase from all the speech values x(i) then occurring in such a manner that from all speech values subsets $C_l$ are formed, which are each time assigned to a prototype reference value. The distances between all speech values of a respective subset and the associated prototype reference value are summed up and these sums are summed up over all the n prototype reference values so that the following total value is obtained:

$$D = \sum_{l=1}^{n} \sum_{i=1}^{b_l} d(x(i),l) \quad (5)$$

The subsets $C_l$ and the prototype reference values included therein are now varied in such a manner that the total value D becomes as small as possible. Since this is effected during the learning phase, this does not require a real-time processing, but the calculation operation carried out here for one time can also require a considerable amount of time.

The conditional probability p(1/j) that a prototype reference value $C_l$ occurs in a phoneme j can be determined from the ratio between the frequencies H(1,j) at which this prototype occurs in the relevant, phoneme during the learning phase and the number H(j) of all prototype reference values in this phoneme in the following manner:

$$p(l/j) = \frac{H(l,j)}{H(j)} \quad (6)$$

However, a sufficiently large number of learning speech values or a satisfactory distribution of the learning speech values are then required.

In the practical case with a limited quantity of learning speech values, it may now happen that a prototype reference value altogether has a small frequency of occurrence with respect to other prototype reference values. In this case, the ratio of the frequency of occurrence of this prototype reference value in a given phoneme to the frequency of occurrence of all prototype reference values in this phoneme is necessarily small, although this particular prototype reference value occurs almost only in this phoneme. Further, the frequency of occurrence of different phonemes is different, which then leads to a small distance measure and hence to a preference of these phonemes during the recognition. For this reason, a distance measure is therefore to be aimed at with which the differences of the frequency at which the individual prototype reference values have occurred during the learning phase and the frequency at which the different phonemes have occurred are at least reduced by a standardization.

Such a standardization takes place to a certain extent by the equations indicated below:

$$m_l = \frac{1}{n} \sum_{j=1}^{n} H(l,j) \qquad (7)$$

$$N = \min_l (m_l)$$

$$Q_{lj} = H(l,j) \frac{N}{m_l}$$

$$n_j = \min_l Q_{lj}$$

$$N_j = \max_l Q_{lj}$$

$$S_j = \frac{B}{N_j - n_j}$$

$$p'(l/j) = \left( \frac{Q_{lj} S_j}{n_j G} \right)$$

First the frequency of occurrence of each prototype vector $Z_l$, in this case the average frequency of occurrence of a prototype reference value in a phoneme, is consequently determined and then the minimum N is determined therefrom, whereupon all the frequencies are standardized on this minimum, as a result of which standardized frequencies $Q_{lj}$ are obtained. Essentially, the standardization could also have taken place on any other values; it is essential that the sum of the standardized frequencies is equal over each prototype reference value. Subsequently, the smallest and the largest standardized frequency of all prototype reference values are determined for each time one phoneme, whereupon a scaling factor $S_j$ is determined, which ensures that the values of all the conditional probabilities p'(1/j) or the logarithms have a constant range of values. The negative logarithms of these conditional probabilities are then the distance measures used for the recognition. Since between brackets there is standardized for the conditional probability on the minimum frequency of a prototype reference value in a phoneme, the distance value for this minimum standardized frequency is equal to zero, while this value for the maximum frequency is determined by the value B from the equation for the scaling value $S_j$. This value B is effectively chosen so that it yields a favourable range of values of the distance measures for technically carrying out the calculation. Thus, not so much the conditional occurrence probability as the relative information content between learning speech values and phonemes is taken into account. During the recognition, this leads to more favourable results.

Figure 2:
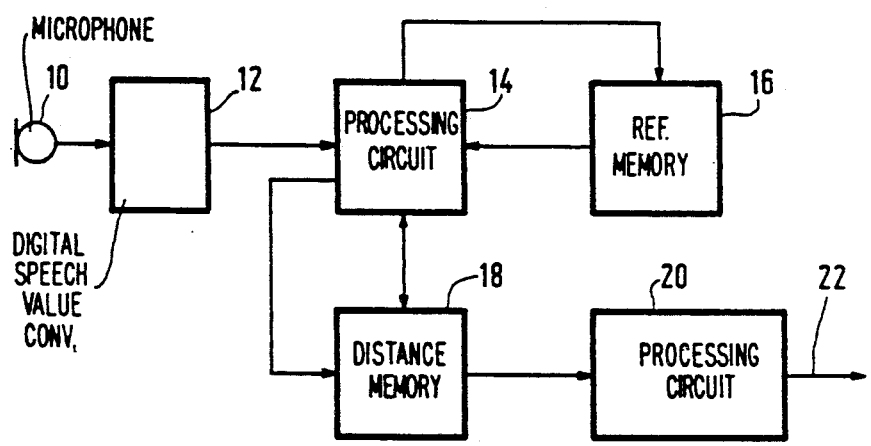
FIG. 2 shows a block circuit diagram of an arrangement for carrying out the method according to the invention.

In an arrangement for carrying out the method described, of which the block diagram is shown in FIG. 2, the speech signal recorded via the microphone 10 is amplified in a circuit 12 and is thereon converted into a sequence of digital speech values, which are supplied to a processing circuit 14. This circuit addresses at each new speech value from the circuit 12 successively all the storage sites of a first memory 16 for reference values and compares each reference value with the speech signal. Further, the processing circuit 14 addresses a second memory 18, which contains the distance sums determined thus far for the individual reference values, and reads for each reference value read out from the first memory 16 the distance values of given reference values from the second memory 18. At a reference value of the first memory 16, which lies within a sequence of equal reference values corresponding to a phoneme, only one distance sum, i.e. that of the preceding reference value, is read from the second memory 18 and is added to the comparison result without being changed and is stored again in the memory 18 at the instantaneous reference value of the memory 16.

At a reference value at the end of a sequence corresponding to the art reference value at a phoneme or section, besides the distance sum of the preceding reference value, also the distance sum of the same reference value is read from the memory 18, but the latter is now increased by a time distortion value. The comparison result is then added to the smaller of the two distance sums and to the increased distance sum, respectively, and is stored in the memory 18 at the instantaneous reference value, i.e. of the last reference value of the sequence.

At the first reference value of a sequence, not only the distance value of the last reference value of the preceding sequence, but also the distance sums of the preceding reference values of this preceding sequence are read from the memory 18, but now these distance sums are increased in dependence upon the position of the associated reference value within the sequence by a time distortion value. The smallest of these distance sums thus increased and not increased, respectively, is added in the processing circuit 14 to the comparison result and the sum is stored in the memory 18 at the relevant first reference value of the sequence. Thus, all the distance sums contained in the memory 18 are updated with each new speech value supplied by the circuit 12.

The distance sums of the memory 18 are further processed by a further processing circuit 20 in one of the known ways in order to determine therefrom the sequence of the known recognized words, whose phonemes therefore have the smallest distance sum in the sum, and to supply them at the output 22.

The memory 16 may contain instead of the reference values for the individual phonemes also prototype reference values as well as each time an associated distance measure, the processing circuit 14 then determining at each newly supplied speech value the next subsequent supplied prototype reference value. The distance measure associated with the prototype reference value is then used as comparison result.

What is claimed is:

1. A method of recognizing words, composed of phonemes, from a speech signal divided into successive sections, the speech signal in each section being converted to a speech value, said method comprising:

storing reference values for comparison with successive speech values and storing distance sums for said reference values attained by comparisons of said reference values with preceding speech values;

comparing each stored reference value within a given neighborhood to a current speech value to determine a comparison result; and determining a new distance sum to be stored for each compared reference value, by adding the comparison result to a quantity determined by considering a position of the compared reference value within a sequence of equal reference values in a current phoneme, utilizing a relationship between phonemes and sequences of numbers of equal reference values, predetermined with the aid of learning speech values, in accordance with the following rules:

a) if the compared reference value is at the end of a sequence of reference values which is in number greater than unity and less than the number of sequential equal reference values predetermined within a phoneme, said quantity is equal to the distance sum stored for the preceding reference value in the sequence;

b) if the compared reference value is at the end of a sequence of equal reference values greater in number than the number of sequential equal reference values predetermined within a phoneme, said quantity is formed by adding a time distortion value to the distance sum previously stored for said reference value;

c) if the compared reference value is the first reference value beginning a sequence of reference values in a new current current phoneme, said quantity is formed by selecting the minimum of sums of time distortion values and the distance sums stored for each reference value in the sequence of reference values in the phoneme preceding the new current phoneme.

2. A method as claimed in claim 1, wherein each speech value comprises a plurality of component values and said comparing step comprises forming each comparison result from the differences between the component values of speech value and reference value.

3. A method as claimed in claim 2, wherein the comparison result is formed from the sum of the squares of the component value differences.

4. A method as claimed in claim 2, wherein the comparison result is formed from the sum of the amounts of the component value differences.

5. A method as claimed in claim 4, wherein the components of the reference values are produced by forming the median values of the component values of the speech values of learning speech signals associated with the respective reference value.

6. A method as claimed in claim 2, wherein the components of the reference values are produced by forming the average values of the components of the speech values of learning speech signals associated with the respective reference value.

7. A method as claimed in claim 1, further comprising in a learning phase, selecting prototype reference values from the speech values then produced and for each combination of prototype reference value and phoneme assigning a distance measure, in that said comparing step is such that as a comparison result the distance measure is used for the prototype reference value assigned to the respective reference value and to the phoneme.

8. A method as claimed in claim 7, wherein by selecting the prototype reference values in such a manner that the sum of the distances of all learning speech values from the respective next prototype reference value is a minimum.

9. A method as claimed in claim 7, wherein for assigning the distance measure, the logarithm of the ratio of the frequency of a prototype reference value in a phoneme to the frequency of all prototype reference values in this phoneme is determined.

10. A method as claimed in claim 7, characterized in that for assigning the distance measure the probability of connection of prototype reference values and phonemes is approached in that differences of the frequency at which during the learning phase the individual prototype reference values have occurred and that at which the different phonemes have occurred are at least reduced by standardization.

11. A method as claimed in claim 7, characterized in that for determining the distance measure the logarithm of the ratio of the frequency of a prototype reference value in a phoneme to the frequency of all prototype reference values in this phoneme is determined.

12. Apparatus for recognizing words, composed of phonemes, from a speech signal divided into successive sections, comprising:

means for converting the speech signal in each section to a speech value;

memory means for storing reference values for comparison with successive speech values and for storing distance sums for said reference values attained by comparisons of said reference values with preceding speech values; and processing circuit means responsive to said converting means and said memory means for comparing each stored reference value within a given neighborhood to a current speech value to determine a comparison result, and for determining a new distance sum to be stored in said memory means for each compared reference value, by adding the comparison result to a quantity determined by considering a position of the compared reference value within a sequence of equal reference values in a current phoneme, utilizing a relationship between phonemes and sequences of numbers of equal reference values, predetermined with the aid of learning speech values, in accordance with the following rules:

a) if the compared reference value is at the end of a sequence of reference values which is in number greater than unity and less than the number of sequential equal reference values predetermined within a phoneme, said quantity is equal to the distance sum stored for the preceding reference value in the sequence;

b) if the compared reference value is at the end of a sequence of equal reference values greater in number than the number of sequential equal reference values predetermined within a phoneme, said quantity is formed by adding a time distortion value to the distance sum previously stored for said reference value;

c) if the compared reference value is the first reference value beginning a sequence of reference values in a new current current phoneme, said quantity is formed by selecting the minimum of sums of time distortion values and the distance sums stored for each reference value in the sequence of reference values in the phoneme preceding the new current phoneme.

13. An apparatus as claimed in claim 12, wherein said processing circuit means is a microprocesor.

14. An apparatus as claimed in claim 12, wherein the first memory (16) contains prototype reference values and fixedly associated distance measures and in that the processing circuit means (14) compares each new speech value with all prototype reference values and utilizes for each prototype reference value, the associated distance measure as comparison result.

* * * * *